United States Patent [19]
Campbell et al.

[11] Patent Number: 5,555,457
[45] Date of Patent: Sep. 10, 1996

[54] MICROWAVE TELEMETRY FOR SENSING CONDITIONS IN ENCLOSED ROTATING AND/OR RECIPROCATING MACHINERY

[75] Inventors: Richard L. Campbell, Chassell; Douglas B. Brumm, Calumet; Carl L. Anderson; Glen L. Barna, both of Houghton, all of Mich.

[73] Assignee: Board of Control of Michigan Technological University, Houghton, Mich.

[21] Appl. No.: 431,042

[22] Filed: Apr. 28, 1995

[51] Int. Cl.⁶ .................................................. G08B 21/00
[52] U.S. Cl. ............................. 340/870.17; 340/870.16; 340/870.3; 73/119 R; 374/154
[58] Field of Search ..................... 340/870.17, 870.16, 340/870.3, 870.31, 445, 447, 448, 449; 73/119 R, 756; 342/50; 475/149, 153; 374/122, 132, 144, 154; 180/337, 338, 339

[56] References Cited

U.S. PATENT DOCUMENTS

| | | |
|---|---|---|
| 3,824,857 | 7/1974 | Smith ................................ 340/870.17 |
| 3,878,721 | 4/1975 | Nath ....................................... 374/154 |
| 4,363,137 | 12/1982 | Salisbury ........................... 340/870.17 |
| 4,468,956 | 9/1984 | Merlo ..................................... 73/119 R |
| 4,703,326 | 10/1987 | Ding et al. ......................... 340/870.16 |
| 4,787,242 | 11/1988 | Shine ..................................... 73/119 R |
| 5,106,202 | 4/1992 | Anderson et al. ...................... 374/144 |
| 5,151,695 | 9/1992 | Rollwitz et al. .................... 340/870.3 |
| 5,446,452 | 8/1995 | Litton ................................. 340/870.17 |

*Primary Examiner*—John K. Peng
*Assistant Examiner*—Andrew Hill
*Attorney, Agent, or Firm*—Michael, Best & Friedrich

[57] ABSTRACT

An apparatus for measuring the pressure within the torque converter of an automatic transmission. The apparatus includes a sensor to sense the interior pressure of the torque converter and generate an electrical signal representative of that pressure. That signal is converted to microwave energy which is radiated into the interior of the torque converter housing from a microwave transmitter located within the torque converter. Receiving microwave antennae exposed to the housing interior receive the microwaves and transmit an electrical signal corresponding to the microwave energy to a remote readout external of the torque converter. The receiving antenna are preferably in the form of resonant slots in the torque converter housing and the slots have a length related to the wavelength of the generated microwaves.

12 Claims, 2 Drawing Sheets

MICROWAVE TELEMETRY FOR SENSING CONDITIONS IN ENCLOSED ROTATING AND/OR RECIPROCATING MACHINERY

BACKGROUND OF THE INVENTION

1. Field of the Invention

This invention relates to devices for sensing selected conditions in confined areas and/or in combination with moving parts and, more particularly, to devices for sensing the temperature of and/or pressure at moving parts in confined or enclosed areas and providing a remote reading of the sensed condition.

2. Description of the Prior Art

This invention will be described as embodied in apparatus for monitoring temperatures and pressures in an automatic transmission. It will be appreciated that a number of other applications are possible, for example to measure strain or vibration in a member, the temperature of a piston, the pressure behind the rings in a piston in an internal combustion engine, or pressure and temperature at gas turbine blades.

There are a number of available technologies for achieving those objectives, but a major problem is to get the sensed condition out of the enclosed areas as a reliable, usable signal, and in a cost effective manner. For example, it has been proposed to bring signals out of an engine using slip rings, and/or mechanical linkages. These have a number of inherent problems. Slip rings are susceptible to electrical noise which affects reliability. Mechanical linkages are difficult to install, requiring extensive modifications to the engine, and are limited as to the speeds to which they can be exposed, i.e., engine RPM.

Another previous method proposed for measuring the temperature of a piston in an internal combustion engine, for example, is to incorporate a plug in the piston wherever a temperature reading is required. These plugs are made of a specially treated alloy capable of withstanding elevated temperatures for a specific period of time. But certain characteristics of the plug, e.g., hardness, are affected by the elevated temperatures, and changes in those characteristics are used to arrive at temperature measurement.

An example of this type of measurement system is disclosed in U.S. Pat. No. 4,787,242 issued Nov. 29, 1988 to Shine. In this patent, an Aluminum-Copper alloy plug is incorporated into the piston. This plug can be a band integrally cast with the piston, a setscrew, or a wedge that is press-fit into the piston. This plug is subjected to a qualifying run of at least 100 hours and the hardness of the plug is then measured. The steady-state temperature of the piston is then calculated by reference to a calibration curve graphing hardness verses temperature for the given alloy mixture. A problem with this type of piston measuring device is that it will not respond to fast temperature transients on the surface of the piston. Further, these devices must be removed from the piston, sent to a laboratory to be tested for hardness, and then the temperature of the piston calculated from the calibration curve. This is a very time consuming process and is unacceptable where the temperature of the piston is needed immediately.

An effective solution to some of these problems is disclosed and claimed in U.S. Pat. No. 5,106,202, assigned to the assignee of this application. That patent uses infrared technology and is quite effective, but has one drawback in that it is limited to line of sight applications.

Devices of the type to which this invention relates will find important application as a research tool in selecting materials and formulating fuel and lubrication products, and also in road testing vehicle components such as an automatic transmission.

SUMMARY OF THE INVENTION

This invention provides an apparatus for measuring a condition on moving parts and/or within a confined space, for example, pressure in the torque converter of an automatic transmission. Sensors are mounted, for example, on the moving part such as the impeller or turbine. The moving part carries a sensor operationally coupled to a microwave transmitter. The sensor generates a signal representative of the sensed condition, e.g., pressure. That signal is processed and excites the antenna of the microwave transmitter which emanates microwaves into the torque converter housing. Receiving antennae are exposed to the microwaves within the transmission housing and the signal received is processed and transmitted to a receiver external of the housing where a readout indicative of the sensed signal is produced.

Various types of elements can be used for pressure sensing, for example conventional piezoresistive or piezoelectric transducers. The preferred embodiment uses a piezoresistive transducer. The processing of the signal generated by the sensor to a useable readout is conventional and, therefore, it will be described only generally to set the proper context for an understanding of the invention.

An analog signal is generated by the piezoresistive transducer, which is in turn processed through an amplifier and voltage-to-frequency converter to produce a square-wave signal. The square-wave signal modulates a microwave transmitter which generates a frequency-modulated microwave signal that is transmitted through a tuned antenna into the interior of the transmission housing. Receiving antenna, or antennae, are coupled to the housing interior and are excited by the microwave signal. Each receiving antenna is connected to a microwave receiver which amplifies and demodulates the microwave signal to restore the square-wave signal representative of the sensed pressure condition. A frequency-to-voltage converter reconverts the square-wave signal to an analog signal corresponding to the sensed pressure. That analog signal is processed to produce a pressure readout.

In the preferred embodiment, the receiving antenna takes the form of slots in the housing having a length determined by, or related to, the wavelength of the microwaves transmitted into the transmission housing. Preferably, the slot length is one-half of the generated wavelength. The slots are filled with a sealing material to prevent fluid leakage but which is permeable to the generated microwaves.

A general object of this invention is to provide for reliable sensing and monitoring of conditions such as pressure and temperature associated with moving parts in enclosed or confined spaces.

A principal object of the invention is to provide an apparatus for measuring transient pressure or temperature in the torque converter of an automatic transmission.

Another principal object of the invention is to provide a wireless, telemetry technique for measuring selected conditions in the torque converter of an automatic transmission.

Another principal object of the invention is to provide an apparatus for measuring selected conditions in the torque converter of an automatic transmission which can be installed with very little custom fitting or modifications to the transmission.

Another principal object of the invention is to provide an apparatus for measuring selected conditions in the torque converter of an automatic transmission at high rotational speeds.

Another principal object of the invention is to provide an apparatus for measuring sensed conditions in the torque converter of an automatic transmission which is suitable for road testing.

Other principal objects and advantages of the invention will become apparent to those skilled in the art upon review of the following detailed description, claims and drawings.

Figure 1:
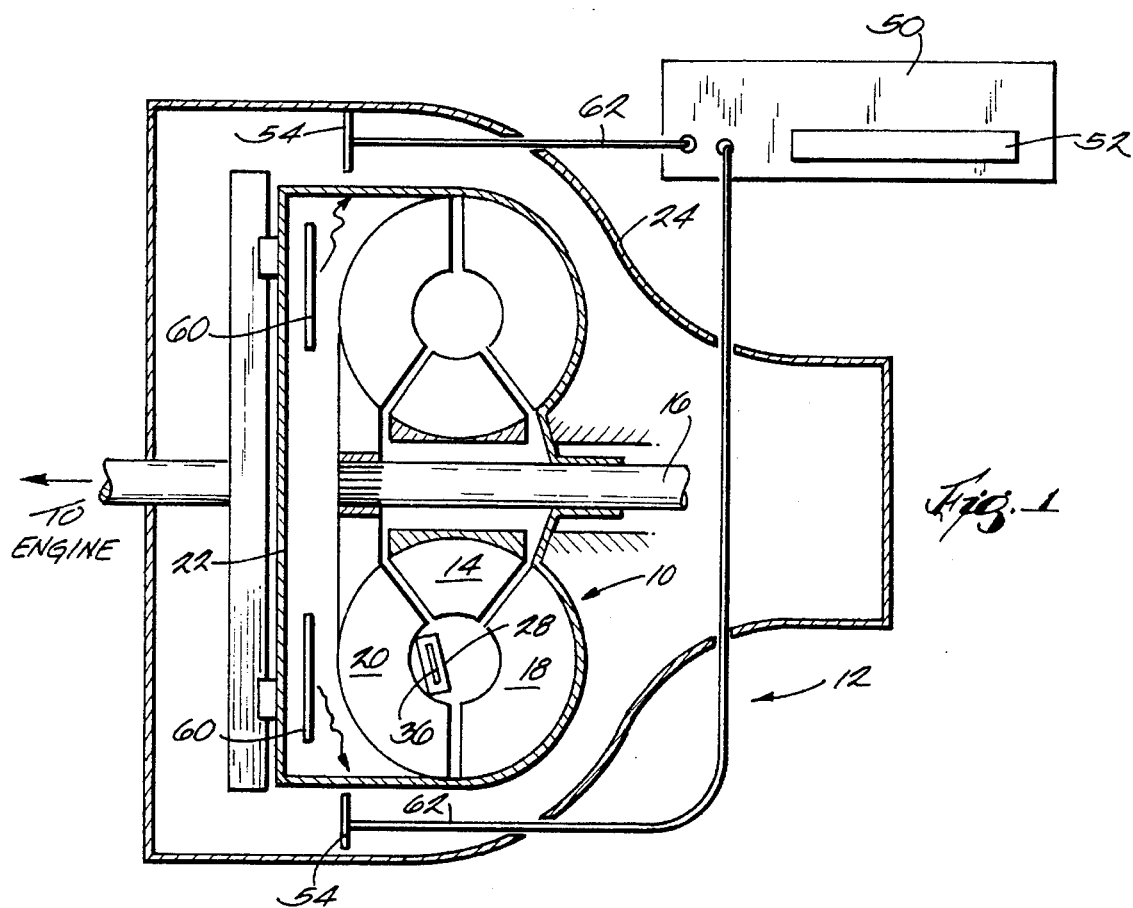
FIG. 1 is a view of a portion of a conventional automatic transmission, including the present invention and partially broken away to expose the interior.

It should be noted as this point that the precise details of construction and arrangement are not part of this invention except where specifically discussed. Therefore, for simplicity, the structural drawings and electric circuit arrangements are illustrated in general schematic fashion.

Furthermore, before the following embodiment of the invention is explained, it is to be understood that the invention is not limited in its application to the details of construction and the arrangement of components set forth in the following description or illustrated in the drawings. The invention is capable of other embodiments and of being practiced or being carried out in other applications. Also, it is to be understood that the phraseology and terminology used herein is for the purpose of description and should not be regarded as limiting.

DESCRIPTION OF THE PREFERRED EMBODIMENT

Apparatus for measuring pressure or temperature inside the torque converter 10 of an automatic transmission 12 is illustrated in FIG. 1.

In a conventional manner, stator 14 is connected to the transmission shaft 16. Stator 14 is operationally associated with the impeller 18 and turbine 20. These elements are enclosed in torque converter housing 22 which is filled with conventional transmission fluid and is itself contained in transmission bell housing 24.

Figure 2:
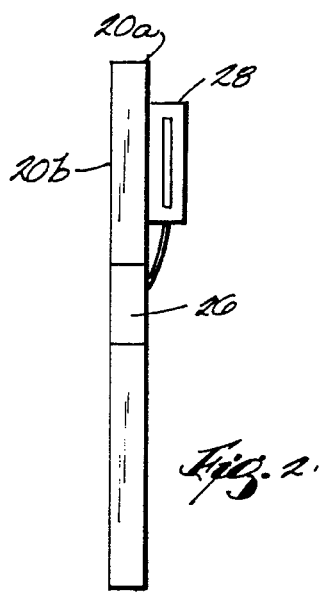
FIG. 2 is an enlarged view of one of a turbine blade illustrating the location of the sensor and transmitter.

A piezoresistive, pressure sensing transducer 26 is supported on one of the turbine blades 20a (see FIG. 2). The pressure sensor 26 is mounted on the turbine blade flush with turbine blade surface 20b. The pressure sensor 26 is operationally part of the signal processing and transmitting unit 28 which is also carried by the turbine blade 20a. The sensor responds to the pressure within the torque converter and produces a voltage proportional to the sensed condition. The physical attachment of the piezoresistive transducer and the microwave transmitting unit can be done in any conventional manner.

Figure 4:
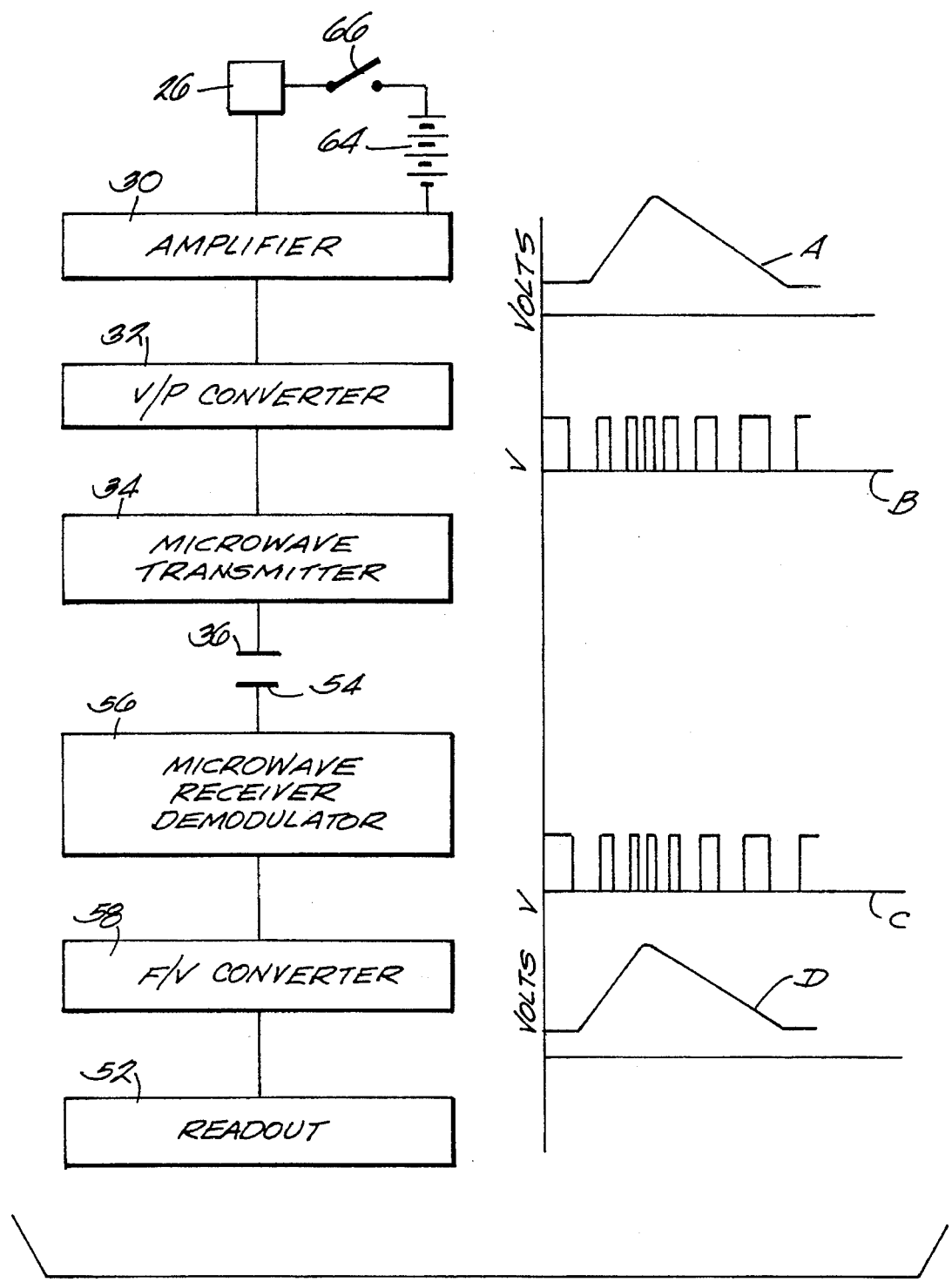
FIG. 4 is a schematic of one data channel.

The unit 28 receives the electrical signal from sensor 26 and generates an analog signal representative of the sensed pressure. Referring to FIG. 4, unit 28 includes an amplifier 30, a voltage-to-frequency converter 32, a microwave transmitter 34 and slot antenna 36. The voltage-to-frequency converter 32 receives the amplified signal and produces a positive square-wave having a frequency related to the current produced by sensor, i.e., the sensed pressure. The components, i.e., amplifier, voltage-to-frequency converter, microwave transmitter and antenna, are all conventional, as is the operational connection of those components.

The signal from the transmitter 34 excites antenna 36 which radiates microwave signal into the torque converter housing 22. The microwave signal passes out of the torque converter housing 22 into the transmission housing via slots 60 in the torque converter housing. Slots 60 are filled with a dielectric medium which provides a fluid tight seal but is permeable to the microwaves. The preferred slot filling material is an RTV silicon sealant.

A microwave receiving unit 50 is located outside of, or remote from, the transmission. Unit 50 receives the microwave signal from inside the transmission and converts that signal to a corresponding pressure readout at 52.

The receiving unit 50 is connected to receiving antenna 54 and includes (FIG. 4) a microwave receiving demodulator 56 and a frequency-to-voltage converter 58. Again, the microwave receiver demodulator and frequency-to-voltage converter are conventional. The receiving antenna can take any of a number of conventional forms but in the preferred embodiment comprises resonant slots in the transmission housing as will be discussed more completely hereinafter.

Before the signal is processed in frequency-to-voltage converter 58, the signal must be amplified. The amplifier (not shown) is included in the receiver demodulator 56.

Further to the specifics of the electrical components and circuitry for generating, processing and reading out the signal reference may be had to the description in U.S. Pat. No. 5,106,202. The circuitry in U.S. Pat. No. 5,106,202 used for the infrared application can be used in this microwave application with conventional modifications to accommodate a microwave signal as opposed to an infrared signal.

FIG. 4 represents one data channel of a unit embodying this invention. The piezoresistive transducer 26 generates a signal that is amplified to produce an analog signal having a voltage characteristic illustrated by curve A. That signal is processed by the voltage-to-frequency converter 32 to produce a square-wave signal B. Signal B modulates the frequency of the microwave transmitter 34, the output of which is radiated into the torque converter housing by slot antenna 36. The generated microwaves fill the torque converter housing and escape into the outer transmission housing through gaps or clearance openings in the moving parts but principally through resonant slots 60 in the housing 22. The microwaves in housing 22 are picked up by receiving antennae 54 which are connected to microwave receiver 56. More particularly, the microwaves are demodulated by microwave receiver demodulator to a square-wave C which is a reproduction of square-wave B. Frequency-to-voltage converter 58 converts the square-wave to an analog signal D which is representative of the analog signal A and accordingly the sensed conditions. This signal D produces the readout.

Figure 3:
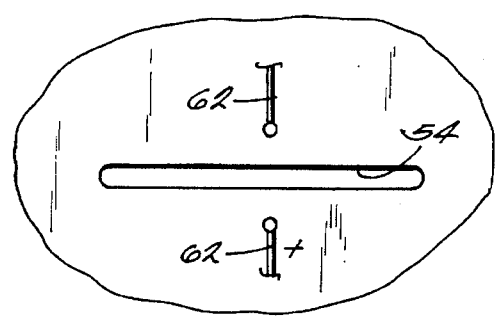
FIG. 3 is a schematic of a receiving slot antenna.

Microwaves, as is well known, will not be able to penetrate the metal walls of the housing (in the disclosed embodiment the inner torque converter housing and the outer transmission housing) except to a minor random extent through clearance openings between moving parts. Exposing the receiving antennae to interior microwaves and transmitting the received signal externally can be done through a number of arrangements. Preferably, the receiving antennae are provided as slots 54 in the transmission housing. The slots are thin, on the order of 0.030 inches, and the length is selected in accordance with the wave-length of the generated microwave. Preferably, the slot length is a fraction of the generated wave, preferably one-half of the generated wavelength. But, it can be selected in the range of one-third to two-thirds wavelength. As the microwave passes through the slot it generates an electric pulse in terminal 62 shown schematically in FIG. 3. Since the condition being sensed is in the inner housing, additional slots 60 are provided in the torque converter housing and are constructed the same as slot 54. The slots in both housings are tuned to the microwaves generated as discussed above. This antenna arrangement is simple and effective.

A battery 64 and switch arrangement 66 are provided as an integral part of interior transmitting unit 28 to provide the necessary power. The battery is preferably a commercially available lithium-thionyl chloride battery capable of providing the appropriate power.

The use of a pulse-frequency-modulated FM microwave signal is preferred because this type of signal a) is easily coupled through the oil and transmission components without requiring an unobstructed path, b) does not require high frequency stability for the microwave transmitter, c) is insensitive to received-signal level fluctuations, d) requires very little power, e) provides a very high received signal-to-noise ratio.

We claim:

1. Apparatus for monitoring a preselected condition associated with moving parts enclosed by a housing and comprising, in combination, means for Bensing the preselected condition and operative to generate an electrical signal corresponding to the sensed condition, microwave transmitting means operatively connected to said sensing means for receiving said electrical signal and converting said electrical signal to microwave energy and radiating said microwave energy into the interior of said housing, microwave receiving means exposed to the interior of said housing for receiving said microwave energy and operative to convert said microwave energy into a second electrical signal corresponding to the electrical signal generated by said sensing means, and said receiving means including a portion external of the housing and operative to convert said second electrical signal into a readout corresponding to said sensed condition.

2. The apparatus of claim 1 wherein said microwave receiving means includes an antenna exposed to the interior of said housing for picking up said microwave energy and transmitting that energy for producing said readout.

3. The apparatus of claim 2 wherein said antenna comprises resonant slots in the housing and including electrical leads coupled with said slot so that a pulse is generated in said leads as a microwave exits said slot.

4. The apparatus of claim 3 wherein the length of said slot is a multiple of the wavelength of the microwave generated within the housing.

5. The apparatus of claim 4 wherein said slot length is one-half of the generated microwave.

6. Apparatus for monitoring a preselected condition with the torque converter of an automatic transmission, said apparatus comprising, in combination, a sensor exposed to the interior of the housing of said torque converter and operative to generate an electrical signal which is representative of the sensed condition within said torque converter housing, a microwave transmitter within said torque converter housing and operatively connected to said sensor, said transmitter converting said signal to microwave energy and radiating microwave energy into the interior of said housing, microwave receiving means exposed to the interior of the transmission housing for receiving said microwave energy and operative to convert said microwave energy into a second electrical signal corresponding to the signal generated by said sensor, and means operatively connected to said microwave receiving means to convert said second signal to a readout corresponding to said sensed condition remote from said transmission housing interior.

7. The apparatus of claim 6 wherein said sensor and said microwave transmitter are connected to and movable with the moving components of said torque converter.

8. The apparatus of claim 6 wherein said microwave receiving means includes receiving antenna exposed to the interior of said transmission housing for picking up said microwave energy and transmitting that energy for producing said readout.

9. The apparatus of claim 6 wherein said receiving antenna comprises resonant slots in the transmission housing and including electrical leads coupled with said slot so that a pulse is generated in said leads as a microwave exits said slot.

10. The apparatus of claim 6 wherein the length of said slot is a multiple of the wavelength of the microwave generated within the housing.

11. The apparatus of claim 6 wherein said slot length is one-half of the generated microwave.

12. A method of measuring a preselected condition within a housing enclosing moving parts comprising the steps of:

sensing the condition and producing a first electrical signal corresponding to the sensed condition;

converting the electrical signal to microwave energy;

radiating said microwave energy into the interior of said housing, picking up said microwave energy within said housing and producing and transmitting a second signal corresponding to said microwave energy externally of said housing, and producing a readout external to said housing and corresponding to said first electrical signal and thus said sensed condition.

* * * * *